(12) United States Patent
Wang et al.

(10) Patent No.: US 12,470,750 B2
(45) Date of Patent: Nov. 11, 2025

(54) SYSTEMS AND METHODS FOR WINDOW ERROR ESTIMATION IMPROVEMENT IN TEMPORAL FILTER

(71) Applicant: Tencent America LLC, Palo Alto, CA (US)

(72) Inventors: Biao Wang, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 72 days.

(21) Appl. No.: 18/494,684

(22) Filed: Oct. 25, 2023

(65) Prior Publication Data

US 2024/0348830 A1    Oct. 17, 2024

Related U.S. Application Data

(60) Provisional application No. 63/459,563, filed on Apr. 14, 2023.

(51) Int. Cl.
*H04N 19/66*    (2014.01)
*H04N 19/132*   (2014.01)
*H04N 19/176*   (2014.01)

(52) U.S. Cl.
CPC .......... *H04N 19/66* (2014.11); *H04N 19/132* (2014.11); *H04N 19/176* (2014.11)

(58) Field of Classification Search
CPC .. H04N 19/117; H04N 19/119; H04N 19/132; H04N 19/176; H04N 19/66; H04N 19/82
See application file for complete search history.

(56) References Cited

U.S. PATENT DOCUMENTS

| | | | | |
|---|---|---|---|---|
| 2020/0169748 A1* | 5/2020 | Chen | ...................... | H04N 19/51 |
| 2020/0236388 A1* | 7/2020 | Esenlik | .................. | H04N 19/52 |
| 2021/0058622 A1* | 2/2021 | Rusanovskyy | ...... | H04N 19/105 |
| 2021/0297684 A1* | 9/2021 | Park | ..................... | H04N 19/159 |
| 2022/0070465 A1* | 3/2022 | Zhu | ....................... | H04N 19/176 |
| 2022/0224893 A1* | 7/2022 | Kim | ..................... | H04N 19/129 |

(Continued)

OTHER PUBLICATIONS

Benjamin Bross et al., "Versatile Video Coding Editorial Refinements on Draft 10", Joint Video Experts Team (JVET) of ITU-T SG 16 WP 3 and ISO/IEC JTC 1/SC 29, Document: JVET-T2002-v2, 20th Meeting, by teleconference, Oct. 2020, 511 pgs.

(Continued)

*Primary Examiner* — Md N Haque
(74) *Attorney, Agent, or Firm* — Morgan, Lewis & Bockius LLP

(57) ABSTRACT

The various implementations described herein include methods and systems for coding video. In one aspect, a method includes receiving video data comprising a current block, where the current block has a size of N×M pixels, N and M being positive integers. The method includes generating a prediction block larger than the current block for the current block, where the prediction block has a size of (N+W)×(M+W) pixels, W being a positive integer; and the method includes determining a window error for a sample window of a sample of the current block using the generated prediction block.

20 Claims, 8 Drawing Sheets

(56) References Cited

U.S. PATENT DOCUMENTS

2023/0010869 A1     1/2023  Hu et al.
2023/0050660 A1*    2/2023  Bankoski ............ H04N 19/105

OTHER PUBLICATIONS

Peter de Rivaz et al., "AV1 Bitstream & Decoding Process Specification", Version 1.0.0 with Errata 1, Alliance for Open Media, Codec Working Group, Jan. 2018, 681 pgs., https://aomedia.org/.
Xin Zhao et al., "Tool Description for AV1 and Libaom", Alliance for Open Media, Codec Working Group, Document: CWG-B078_v1, Oct. 2021, 41 pp. 6.
Yue Chen et al., "An Overview of Core Coding Tools in the AV1 Video Codec", 2018 Picture Coding Symposium, Jun. 2018, 5 pgs.
Tencent Technology, ISR/WO, PCT/US2023/078212, Feb. 28, 2024, 6 pgs.

* cited by examiner

SYSTEMS AND METHODS FOR WINDOW ERROR ESTIMATION IMPROVEMENT IN TEMPORAL FILTER

RELATED APPLICATIONS

This application claims priority to U.S. Provisional Patent Application No. 63/459,563, entitled "Window Error Estimation Improvement in Temporal Filter," filed Apr. 14, 2023, which is hereby incorporated by reference in its entirety.

TECHNICAL FIELD

The disclosed embodiments relate generally to video coding, including but not limited to systems and methods for improving window error estimation in temporal filters.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes improving window error estimation in temporal filters. For example, the improved window error estimation takes into account partitions of a block to be temporally filtered. A temporally filtered sample in a filtered block is obtained by applying respective weights to different predicted samples. The respective weight applied to a respective predicted sample depends on both a window error and a block error associated with the respective predicted sample. When the block to be filtered contains no partition, additional neighboring samples are generated to provide sufficient samples for better window error estimation. When the block to be filter contains partitions, error clipping is applied on the partition level instead of block level to account for the effect of different motion vectors at partition boundaries. Additionally, or alternatively, additional neighboring samples are generated for a particular partition to provide sufficient samples for better window error estimation.

In accordance with some embodiments, a method of video encoding is provided. The method includes (a) receiving video data comprising a current block, where the current block has a size of N×M pixels, N and M being positive integers; (b) generating prediction block larger than the current block (e.g., an enlarged prediction block) for the current block, where the prediction block has a size of (N+W)×(M+W) pixels, W being a positive integer; (c) determining a window error for a sample window of a sample of the current block using the generated prediction block (e.g., the enlarged prediction block).

In accordance with some embodiments, a method of video encoding includes: (i) receiving video data comprising a current block, where the current block has two or more partitions and each partition of the two or more partitions corresponds to a different predictor; (ii) identifying a partition of the two or more partitions in which a sample is located; (iii) generating a sample window for the sample; (iv) performing error clipping for one or more window samples located outside of the identified partition and outside a boundary of the current block; and (v) after performing the error clipping, determining a window error for the sample window.

In accordance with some embodiments, a method of video encoding includes: (i) receiving video data comprising a current block, where the current block has two or more partitions and each partition of the two or more partitions corresponds to a different predictor; (ii) identifying a partition of the two or more partitions in which a sample is located, wherein the partition has a size of N×M pixels, N and M being positive integers; (iii) generating a prediction block (e.g., an enlarged prediction block) larger than the current partition for the partition, where the prediction block has a size of (N+W)×(M+W) pixels, W being a positive integer, and wherein the prediction block is generated using motion vector information of the partition; and (iv) determining a window error for a sample window of the sample using the generated prediction block (e.g., the enlarged prediction block).

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes a set of advanced video coding technologies for improving the weight estimation of temporal filtering by taking into account partitions of a block to be temporally filtered. A temporally filtered sample in a filtered block is obtained by applying respective weights to different predicted samples. The respective weight applied to a respective predicted sample depends on both a window error and a block error associated with the respective predicted sample. Not considering a partition scheme in a block may lead to inaccurate window error. As described in more detail later, when the block to be filtered contains no partition, additional neighboring samples are generated to provide sufficient samples for better window error estimation. When the block to be filter contains partitions, error clipping is applied on the partition level instead of block level to account for the effect of different motion vectors at partition boundaries.

Example Systems and Devices

Figure 1:
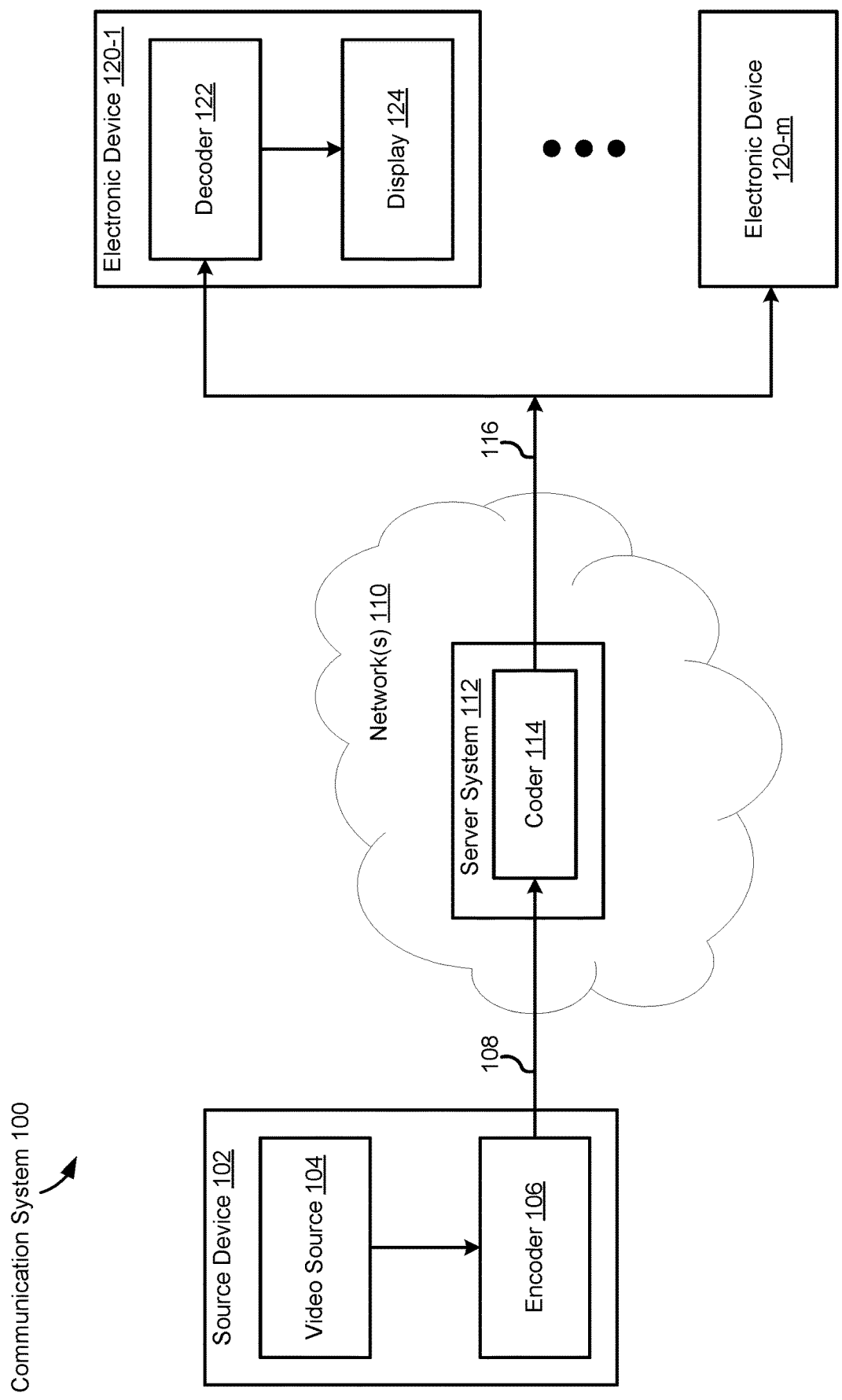
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
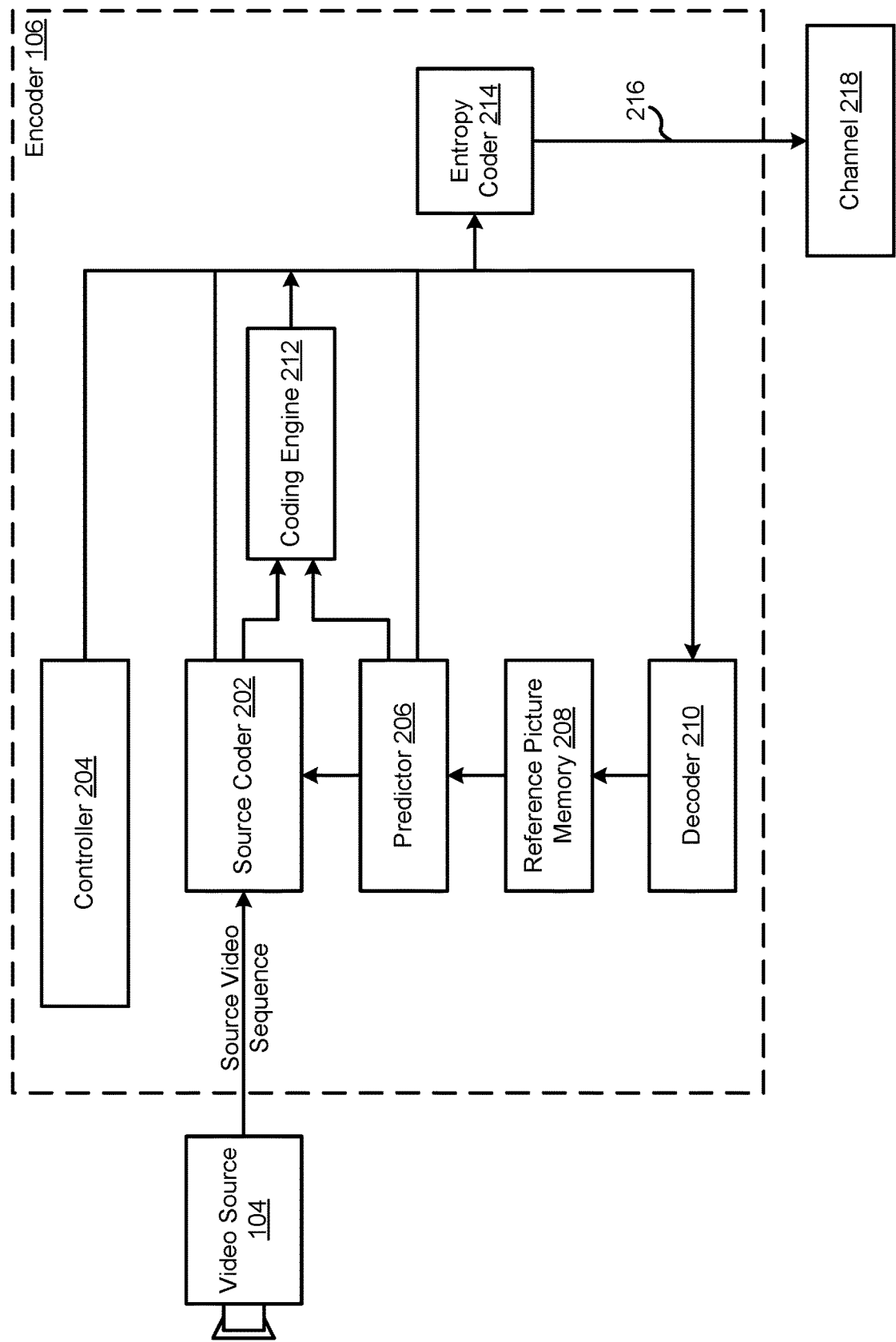
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
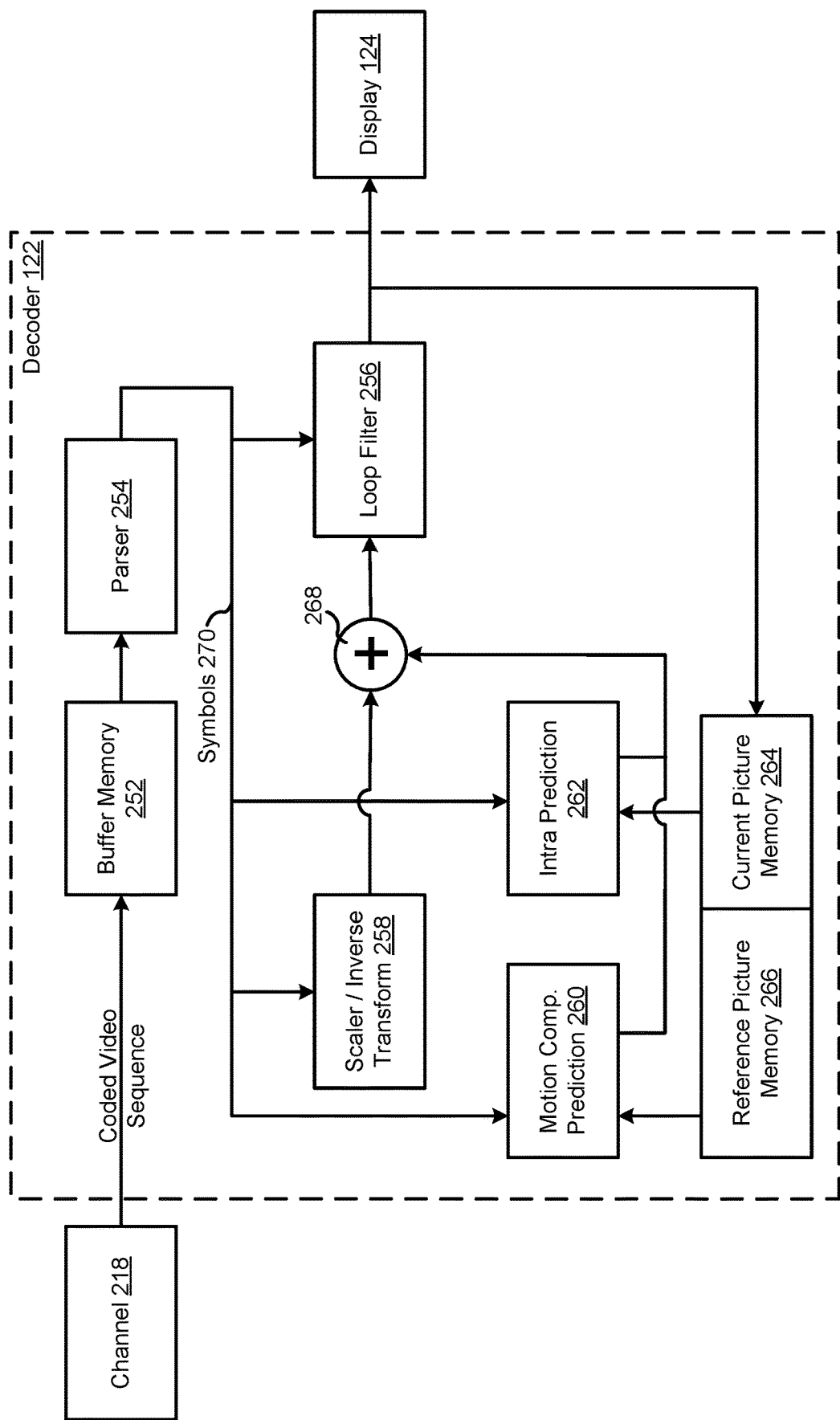
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
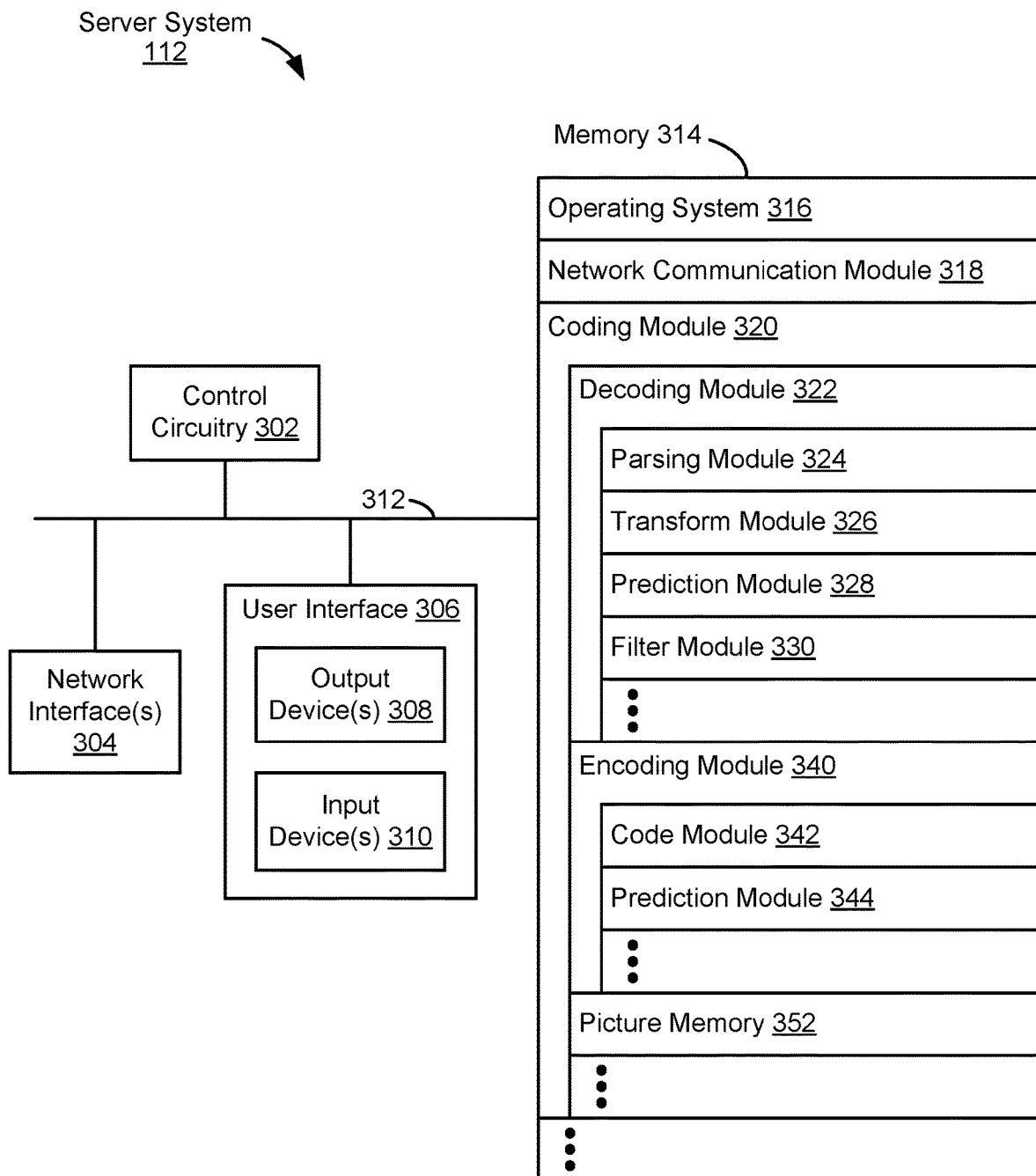
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and
    - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

Figure 4:
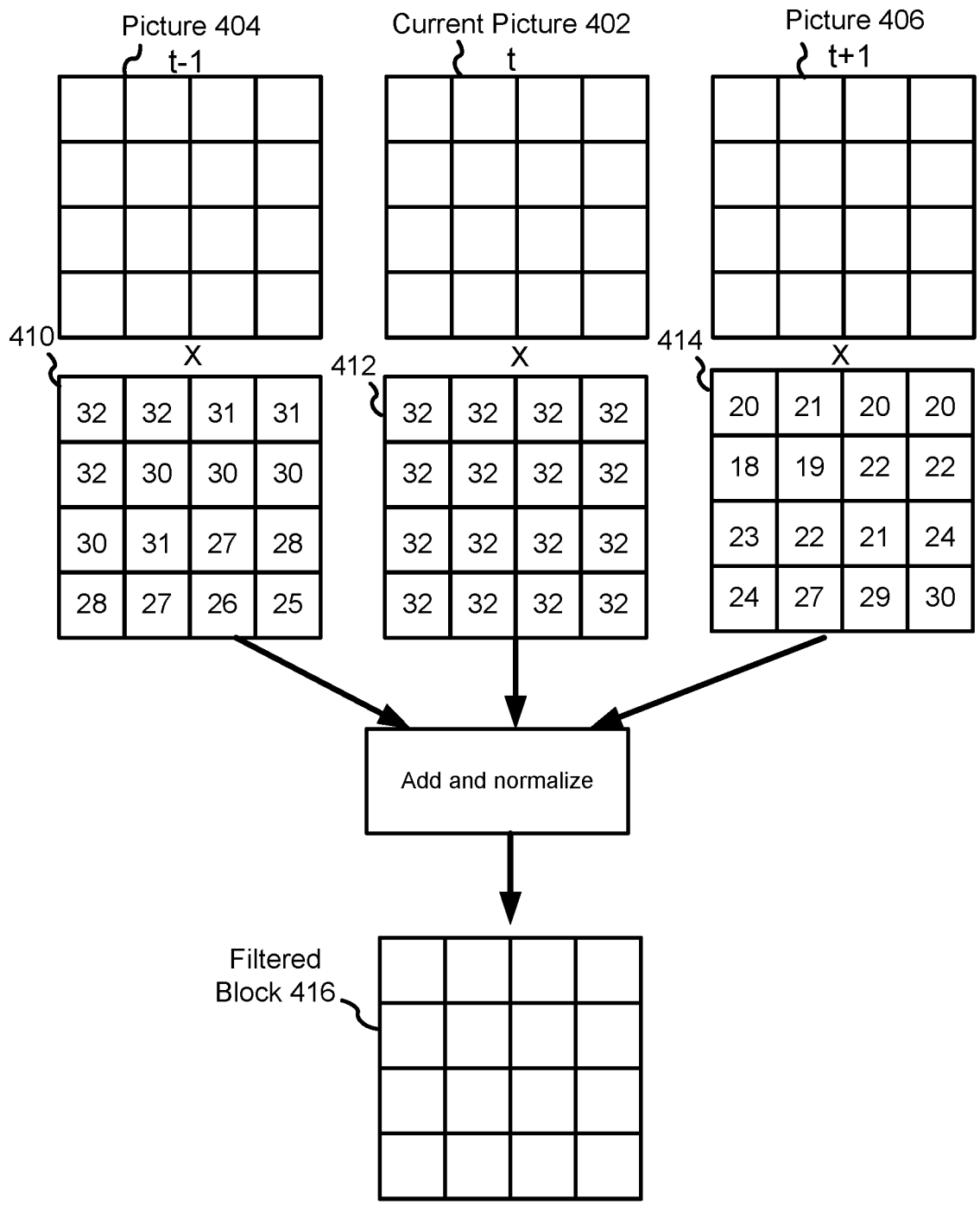
FIG. 4 illustrates an example temporal filtering process in accordance with some embodiments.

The coding processes and techniques described below may be performed at the devices and systems described above (e.g., the source device 102, the server system 112, and/or the electronic device 120). FIG. 4 illustrates an example temporal filtering process in accordance with some embodiments.

A temporal filter is a type of signal processing filter that operates on a time-varying signal to remove unwanted variations or noise that occur over time. It may be used to selectively remove or attenuate signal components at specific frequencies in the time domain. For example, in video processing, temporal filtering can be used to reduce noise and improve the quality of the video by removing unwanted variations in brightness or color over time. In video coding, an encoder may consider both distortion (e.g., error with respect to ground truth block) and bit rate (e.g., cost to encode the error) when minimizing a metric of rate*lambda+distortion for each coding block. Lambda is a tuning factor dependent on the desired trade-off between error (e.g., minimizing the distortion and/or achieving the highest quality) and bit rate (e.g., desirable to use the least bit rate possible), which relate to two competing objectives.

FIG. 4 illustrates an example temporal filtering process that uses three reference pictures or frames (e.g., picture 404, current picture 402, and picture 406, alternatively also denoted as picture (t−1), picture (t), and picture (t+1)). The current picture 402 represents the current frame to be filtered. When a following frame (e.g., a frame of video data that is later than a current frame) is only slightly different from the current frame (e.g., current picture 402), the coding of a block in that following frame (e.g., picture 406) is likely to be skipped. In such scenarios, a metric to be minimized in the coding process is rate*lambda+distortion1+distortion2. For example, distortion1 is the error in a coded block of current picture 402 relative to the ground truth block (e.g., the original block) in picture 402 while distortion2 is the error in the coded block of current picture 402 relative to the ground truth block in picture 406 (e.g., as the coding block for picture 406 has been skipped).

In some embodiments, rather than calculating the two distortions separately, the distortion between the coded block and the average of the original versions of the two pictures (e.g., an average of original current picture 402 and original picture 406) can be calculated. In some embodiments, the original versions of the two pictures correspond to frames in a video data stream (e.g., raw video data). Thus, the use of temporally filtered original pictures may improve coding efficiency (e.g., by minimizing the number of calculations to determine the respective distortion). In some embodiments, the filter strength drops off rapidly if the original frames are different (e.g., the subsequent original picture is weighted lightly and contributes less to the averaged/filtered frame if the subsequent picture is significantly different from the first original frame), as it is less likely that the decoded sample values for the first picture will be re-used for the second picture.

In some embodiments, temporal filtering involves three stages. The first stage of temporal filtering involves motion estimation (ME), as a coding block would likely not stay still in a sequence, but with some motion (e.g., a motion vector MV0 in FIG. 5A describes the motion of a current block 511 in current picture 502 with respect to reference block 513 of reference picture 504, and/or a motion vector MV1 describes the motion of a current block 511 in current picture 502 with respect to reference block 515 of reference picture 506). For a coding block, the stage of motion estimation involves finding the best motion vector with the least error in a specific reference frame. To reduce complexity, the search range for the best motion vector is usually limited to a pre-defined distance relative to motion vector (0,0), which corresponds to its co-located block in the reference frame (e.g., the block staying still between the current frame and the reference frame).

After the best motion vector is found in the motion estimation stage, the second stage of temporal filtering involves motion compensation (MC). Motion compensation takes, as input, the motion vector produced at the motion estimation (ME) stage and the reference frame. It then applies an interpolation filter on the reference samples in the reference frame pointed by the motion vector (e.g., from the current block) and generates a predicted block for the current block.

In the final stage of filtering, the prediction of the current block (e.g., obtained during the motion compensation (MC) stage) is assigned a weight. For example, in FIG. 4, the blank squares in the picture 404, current picture 402, and picture 406 may alternatively be considered to denote respective predicted blocks of those pictures based on the motion vector and reference frame associated with respective pictures. In some embodiments, filtering is done using predicted samples and estimated weights. In FIG. 4, the weights for respective blocks of picture 404 are shown in a grid 410, the weights for respective blocks of current picture 402 are shown in a grid 412, and the weights for respective blocks of picture 406 are shown in a grid 414. The weighted predictions (e.g., by multiplying grid 410 with the corresponding predicted blocks of picture 404, by multiplying grid 412 with the corresponding predicted blocks of current picture 402, and by multiplying grid 414 with the corresponding predicted blocks of picture 406) are aggregated and divided by the total weights to yield a filtered block 416. In some embodiments, the use of an unfiltered "self frame" allows the current frame to contribute information to the final filtered blocks.

The final filtered sample (e.g., in filtered block 416) is denoted as Pfiltered and derived using Equation 1:

$$P_{filtered} = \frac{\sum (w_i * P_i)}{\sum w_i} \quad \text{Equation 1}$$

Filter Sample where $w_i$ is the weight of prediction (e.g., $w_i$ is represented by the grid 410, the grid 412, and the grid 414) and Pi is the predicted sample (e.g., from motion compensation (MC), denoted by the blank squares in the picture 404, current picture 402, and picture 406), and i indicates an index of a reference picture list.

In some embodiments, the weight $w_i$ is estimated based on the error between the predicted samples (e.g., obtained from motion compensation) and the original samples (e.g., the original picture frames from the original/raw video data). In some embodiments, when the error is larger, the weight is correspondingly smaller. Similarly, in some embodiments, a larger motion vector indicates the reference area is not so reliable (e.g., being further away), and a smaller weight is correspondingly provided for the larger motion vector.

In some embodiments, temporal filtering is applied as a pre-encoding process, and replaces the frame to be encoded (e.g., the original frame from the video data) with a filtered frame (e.g., filtered block 416 in FIG. 4). In some cases, the temporal filtering process can be decoupled from the encoder pipeline, allowing a temporal filter used in one codec to be applied to other codecs as well. For example, after the coding is finished for one frame, the encoder decides which reference frame stored in the decoded frame buffer needs to be replaced, and this update is explicitly signalled in the bitstream. In some embodiments, the decoded frame buffer stores different types of reference frames, including an alternate reference frame (ARF) that can be a frame from either the past or the future. ARFs can be synthesized by the encoder, for example, by temporal filtering along the motion trajectories of multiple (e.g., consecutive) original frames. Such synthesized frames may remove (e.g., partially remove, or substantially remove) acquisition noise on individual frames to potentially reduce the collective prediction errors among several display frames, while coding common information of the multiple original frames to optimize the overall rate-distortion performance.

Figure 5A:
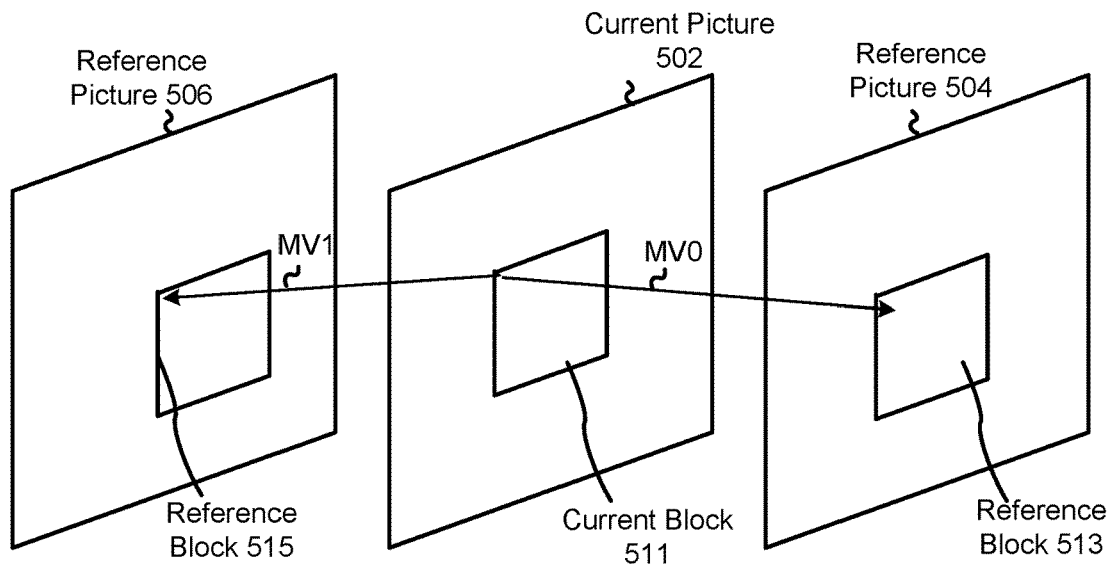
FIG. 5A illustrates a prediction process in accordance with some embodiments.

FIG. 5A illustrates a prediction process in accordance with some embodiments. As discussed previously, one option of predicting the current block 511 (e.g., a CU) of a current picture 502 (e.g., with a size of w×h) is by using MV0 from reference block 513 of reference picture 504. A second option of predicting the current block 511 is by using MV1 from reference block 515 of reference picture 506.

Figure 5B:
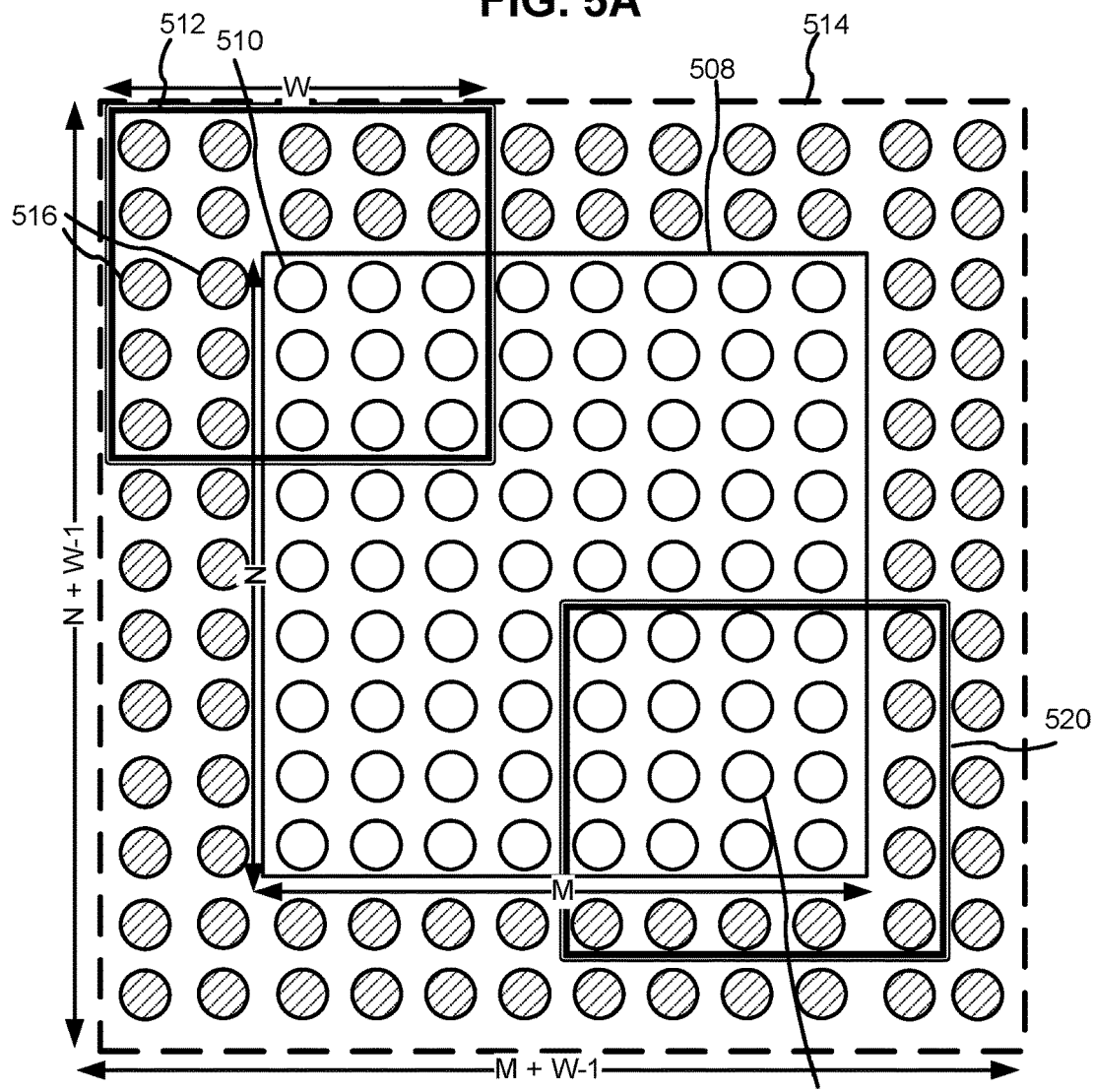
FIG. 5B illustrates scenarios for determining a window error associated with a block that does not include any partitions in accordance with some embodiments.

FIG. 5B illustrates scenarios for determining a window error associated with a block that does not include any partitions, in accordance with some embodiments. For a block 508 that does not include any partitions, the block size corresponds to the number of samples in the entire block. For example, the block size is defined as N×M samples (e.g., in the motion estimation stage for block 508). In some embodiments, as illustrated in FIG. 5B, N is the same as M, for example, the block size may be 32×32 samples, 64×64 samples, or other sizes of samples. In some embodiments, N is different from M, for example, the block size may be 32×64, 16×32, or other size of samples. The weight of prediction ($w_i$) for a specific reference frame that is associated with the block 508 is performed at the sample level. For each sample, two types of error are estimated: the window error and the block error.

A window (e.g., a 5×5 window, or a window of a different size) is defined for each sample such that the current sample is located at the center of the window. As shown in FIG. 5B, a window 512 is centered at a sample 510 at the top left corner of the block 508. The sample 510 is a boundary sample of the block 508. The window 512 in FIG. 5B has a size of W×W and includes 5×5 samples, as an example. Windows may have other sizes (e.g., 3×3, 7×7, 15×15, or other sizes). Samples 516 are outside the boundaries of block 508 but within the window 512. For a boundary sample (e.g., sample 510) having a window of size W, the number of samples within the window but outside of the block, along a first dimension of the window (e.g., a width dimension) is (W−1)/2. For example, where W is 5, there would be two samples along a particular row (e.g., along the width dimension) of the window that are outside the boundaries of the block but within the window.

For such cases, in some embodiments, a prediction buffer 514 associated with the block 508 is expanded or enlarged to (N+(W−1))×(M+(W−1)) pixels to fully encompass the samples within the window of a sample at the boundary of the block (e.g., sample 510) so that all samples for window error estimation of the boundary samples are collected within the window. In some embodiments, the prediction buffer 514 (hereinafter also alternatively referred to as "enlarged prediction buffer," or "enlarged prediction block") is generated at motion compensation stage.

The window error for the sample 510 includes the error of all the samples within the window 512, centered at the sample 510. In some embodiments, the square of absolute difference of each sample in the block 508 (e.g., a 32×32 block, or blocks of other sizes) is pre-calculated, and aggregated in a window (e.g., a 5×5 window, or windows of other sizes) for a specific sample. For example, the difference of each sample is the difference between the original sample and the predicted sample based on the reference frame and the motion vector. In this way, computational complexity may be reduced as neighboring samples do not have to re-calculate the window error of overlapped samples between their respective windows (e.g., their respective 5×5 windows). In some embodiments, the window error is a sum of absolute differences (SAD) or sum of squared errors (SSE) or other metric calculated based on the difference between the original sample and the predicted sample (e.g., predicted based on a motion vector and an associated reference frame). For blocks having no partitions, the block error (e.g., SSE or SAD) is calculated and normalized for each sample in the block (e.g., a 32×32 block).

In some embodiments, the values of the sample 516 in the prediction buffer 514 are populated using corresponding values of the samples in the reference frame associated with the block 508 while taking into account the motion vector associated with the block 508. For example, if the motion vector associated with the block 508 is (0,0), then the value of the sample to the left of sample 510 in its co-located block in the reference frame is placed in the prediction buffer 514.

Sample 518 is also considered a boundary sample because a portion of the samples in the window 520 associated with sample 518 is outside the boundaries of the block 508, due to the size W of the window 520, even though sample 518 is not the sample at the very edge of block 508.

Figure 5C:
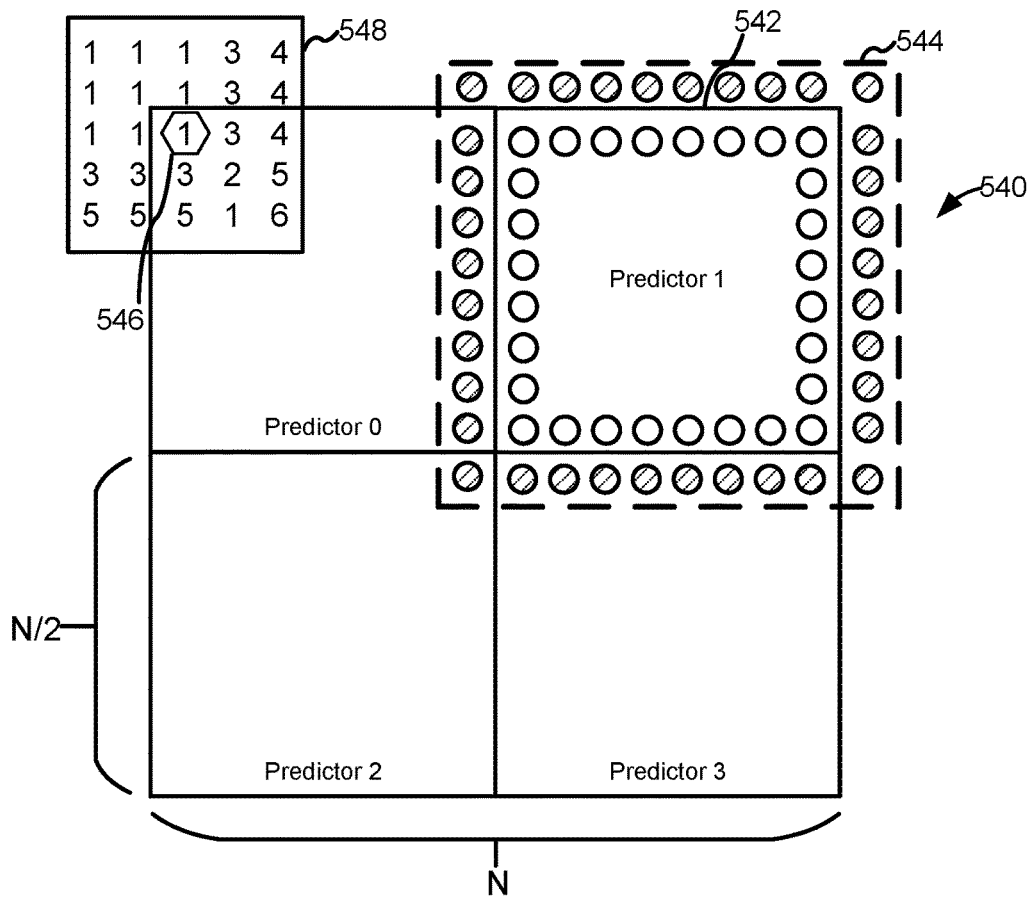
FIG. 5C illustrates examples scenarios for determining a window error associated with a block that includes two or more partitions in accordance with some embodiments.
Figure 5D:
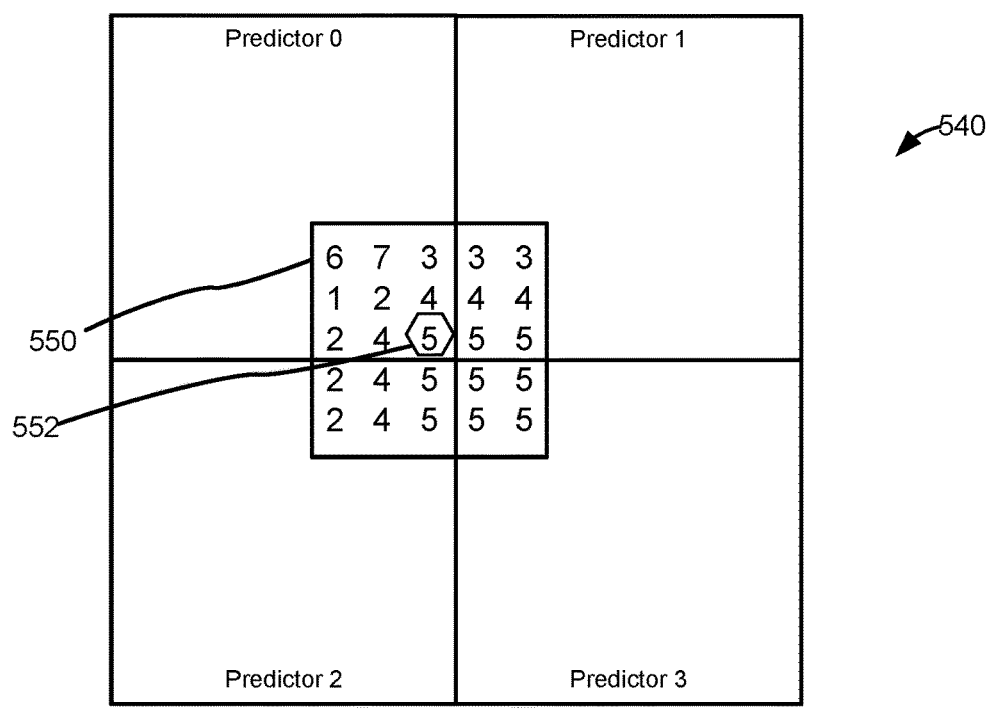
FIG. 5D illustrates additional examples scenarios for determining a window error associated with a block that includes two or more partitions, in accordance with some embodiments.

FIGS. 5C and 5D illustrate scenarios for determining an error associated with a block that includes partitions, in accordance with some embodiments. In some embodiments, each partition is further divided into sub-partitions (e.g., a 16×16 partition is further divided into four 8×8 partitions). When partitions are enabled and N partitions (or sub-partitions) are formed (e.g., N=4, or some other number), N corresponding motion vectors (one for each partition or sub-partition) are generated. For partitions (or sub-partitions) that include content with divergent motion, such a sub-partitioning scheme allows better prediction to be achieved using respective motion vector for each partition or sub-partition (e.g., each 16×16 partition), compared to using a single motion vector that applies for the entire block (e.g., the entire 32×32 block).

For example, if partitions are enabled, a respective motion compensation is applied to each partition (e.g., each of four 16×16 partitions). As shown in FIG. 5C, the prediction is then collected in a buffer (e.g., a 32×32 buffer having four 16×16 portions), as belonging to a respective predictor (e.g., predictor 0, predictor 1, predictor 2, and predictor 3).

FIG. 5C illustrates examples scenarios for determining a window error associated with a block that includes two or more partitions, in accordance with some embodiments. In FIG. 5C, the block 540 having a block size of N×N (e.g., 32×32, or other sizes) is divided into four partitions each having a size of N/2×N/2 (e.g., 16×16, or other sizes). Instead of having a prediction buffer (e.g., like the prediction buffer 514 in FIG. 5B, or an enlarged prediction buffer) for the entire block 540, a prediction buffer 544 (e.g., an enlarged prediction buffer, enlarged prediction buffer 544) schematically illustrated in FIG. 5C is provided for each partition. The size of the enlarged prediction buffer depends on the window size. For a window having a size of W×W, and a partition 542 having a size of N/2×N/2, the prediction buffer 544 has a size (N/2+(W−1))×(N/2+(W−1)). The boundary samples in the partition corresponding to predictor 1 are illustrated as blank circles while the samples within the window but outside of the partition are illustrated as hatched circles. Even though only a single layer of boundary samples is illustrated, the number of layers of boundary samples depends on the size of the window (e.g., as illustrated by sample 518 in FIG. 5B, which is a boundary sample not at the edge of the block). Similarly, even though only a single layer of hatched circle is illustrated, the number of samples in the prediction buffer 544 depends on the size of the window. The manner of populating the window outside the boundaries of the partition is similar to that described in reference to FIG. 5B. For example, the motion vector associated with the partition 542 is used to populate the corresponding samples outside of the partition 542 but within the window of the boundary sample from the reference frame. Having partitions in the block 540 allows prediction results for samples in the block to be collected in respective partitions (e.g., four 16×16 partitions), instead of a single block buffer (e.g., a 32×32 block buffer, or a N×M buffer).

In addition to expanding the prediction buffer, another way of populating the window for samples that are outside the boundaries of a partition is termed "error clipping." In error clipping, the value of a respective sample on the boundary (e.g., a sample at the edge row or column of the partition) is copied, reused, or replicated as a sample within the window but outside the partition, at a location adjacent to the respective boundary sample (the sample to the left of the sample 546 shares the same value as sample 546 in FIG. 5C). As illustrated in FIG. 5C by the window 548 in the top left partition, which corresponds to Predictor 0. Other remaining samples are populated in a similar fashion (e.g., the sample two columns to the left of the sample 546 is replicated with the value of the sample one column away on the left from the sample 546). The row above the sample 546 is similarly populated.

In this way, the values of some boundary samples and their associated errors within the block, partition, or sub-partition, are copied or reused in the samples within the window that are outside the boundary of the block, partition, or sub-partition. As described earlier, the associated error of a sample within each partition or block is a difference between the original sample and the predicted sample (e.g., predicted based on the motion vector associated with the partition and the reference frame corresponding to the partition).

FIG. 5D illustrates additional examples scenarios for determining a window error associated with a block that includes two or more partitions, in accordance with some embodiments. While window 548 shows error clipping performed at a sub-partition boundary that is also a block boundary, FIG. 5D shows an example of embodiments in which error clipping is not only performed for samples at block boundary but also at partition (or sub-partition) boundaries. In some embodiments, error clipping is only applied at the boundaries of respective partitions that are also boundaries of the block. In some embodiments, error clipping is applied at both the boundaries of respective partitions that are also boundaries of the block, and the boundaries of respective partitions that are not boundaries of the block. Applying the error clipping operation at the partition or sub-partition level instead of the block level may improve window error estimation, as different motion vectors (e.g., between the partition or sub-partition) may generate samples with a large difference at sub-partition boundaries.

For example, in FIG. 5D, Predictor 1 may have a motion vector that is very different from the motion vector associated with Predictor 0. Instead of using the left bottom samples of the top right partition associated with Predictor 1 within the window 550 for the sample 552 in the top left partition corresponding to Predictor 0, error clipping is applied such that the value of sample 552 is replicated as samples to the right of the sample 552 in window 550. In this way, the samples in the window 550 would be more likely to share the same motion vector as the samples within the top left partition (corresponding to Predictor 0).

For example, suppose (x, y) represents the coordinate of a sample within a N×M block, where x is inclusively within a range [0, N−1] and y is inclusively within a range [0, M−1]. Suppose there is a sub-partition S, the sample within this sub-partition has a coordinate $(S_x, S_y)$, where $S_x$ is inclusively within a range $[S_{xmin}, S_{xmax}]$. $S_{xmin}$ and $S_{xmax}$ satisfy the constraint $(0<=S_{xmin}<=S_{xmax}<=N-1)$. Similarly, $S_y$ is inclusively within a range $[S_{ymin}, S_{ymax}]$, and $S_{ymin}$ and $S_{ymax}$ satisfy the constraint $(0<=S_{ymin}<=S_{ymax}<=M-1)$. Centered at this sample, a window with size (W×W) can be represented with the coordinators of the windows' top left, bottom left, top right, bottom right corner. Their coordinates are $(S_x-W/2, S_y-W/2)$, $(S_x-W/2, S_y+W/2)$, $(S_x+W/2, S_y-W/2)$, $(S_x+W/2, S_y+W/2)$, respectively.

Samples at the boundary of sub-partition have coordinate $(S_x, S_y)$ that satisfy the following conditions: $S_x==S_{xmin}$, $S_x==S_{xmax}$, $S_y==S_{ymin}$, or $S_y==S_{ymax}$.

In accordance with a determination that $S_x$ matches $S_{xmin}$ (e.g., $S_x==S_{xmin}$), the sample is determined to be on the left (vertical) boundary of the sub-partition. The samples within the left half of the W×W window will be out of the current partition. The horizontal coordinate $S_{xw}$ of these samples satisfy $(S_{xmin}-W/2)<=S_{xw}<S_{xmin}$.

In accordance with a determination that $S_y$ matches $S_{ymin}$ (e.g., $S_y==S_{ymin}$), the sample is determined to be on the top (horizontal) boundary of the sub-partition. The samples within the top half of the W×W window will be out of the current partition. The vertical coordinate $S_{yw}$ of these samples satisfy $(S_{ymin}-W/2)<=S_{yw}<S_{ymin}$.

In accordance with a determination that $S_x$ matches $S_{xmax}$ (e.g., $S_x==S_{xmax}$), the sample is determined to be on the right (vertical) boundary of the sub-partition. The samples within the right half of the W×W window will be out of the current partition. The horizontal coordinate $S_{xw}$ of these samples satisfy $S_{xmax}<S_{xw}<=(S_{xmax}+W/2)$.

In accordance with a determination that $S_y$ matches $S_{ymax}$ (e.g., $S_y==S_{ymax}$), the sample is determined to be on the bottom (horizontal) boundary of the sub-partition. The samples within the bottom half of the W×W window will be out of the current partition. The vertical coordinate $S_{yw}$ of these samples satisfy $S_{ymax}<S_{yw}<=(S_{ymax}+W/2)$.

As explained in reference to error clipping for the window 548 in FIG. 5C, for samples that are within W×W window of boundary samples but outside of the current sub-partition, their error is set to be equal to their corresponding boundary samples within the current partition. Suppose the error of a boundary sample is E $(S_x,S_y)$, where $(S_x,S_y)$ represents the coordinates of the boundary sample.

For samples on the left boundary (e.g., where $S_x$ matches $S_{xmin}$), the left half of the samples within the W×W window of these boundary samples are out of the partition. In embodiments using error clipping, the error E $(S_{xw}, S_{yw})$ for these samples that are out of the partition is set as E $(S_{xmin}, S_{yw})$, where $S_{xw}$ satisfies $(S_{xmin}-W/2)<=S_{xw}<S_{xmin}$ and $S_{yw}$ satisfies $(S_{ymin}-W/2)<=S_{yw}<=(S_{ymax}+W/2)$.

For samples on the top boundary (e.g., where $S_y$ matches $S_{ymin}$), the top half of the samples within the W×W window of these boundary samples are out of partition. In embodiments using error clipping, the error E $(S_{xw}, S_{yw})$ for these samples that are out of the partition is set as E $(S_{xw}, S_{ymin})$, where $S_{yw}$ satisfies $(S_{ymin}-W/2)<=S_{yw}<S_{ymin}$ and $S_{xw}$ satisfies $(S_{xmin}-W/2)<=S_{xw}<=(S_{xmax}+W/2)$.

For samples on the right boundary (e.g., where $S_x$ matches $S_{xmax}$), the right half of the samples within the W×W window of these boundary samples are out of partition. In embodiments using error clipping, the error E $(S_{xw}, S_{yw})$ for these samples that are out of the partition is set as E $(S_{xmax}, S_{yw})$, where $S_{xw}$ satisfies $S_{xmax}<S_{xw}<=(S_{xmax}+W/2)$, and $S_{yw}$ satisfies $(S_{ymin}-W/2)<=S_{yw}<=(S_{ymax}+W/2)$.

For samples on the bottom boundary (e.g., where $S_y$ matches $S_{ymax}$), the bottom half of the samples within the W×W window of these boundary samples are out of partition. In embodiments using error clipping, the error E $(S_{xw}, S_{yw})$ for these samples that are out of the partition is set as E $(S_{xw}, S_{ymax})$, where $S_{yw}$ satisfies $S_{ymax}<S_{yw}<=(S_{ymax}+W/2)$ and $S_{xw}$ satisfies $(S_{xmin}-W/2)<=S_{xw}<=(S_{xmax}+W/2)$.

In some embodiments, a sub-partition is further divided, resulting in a recursive partition, or multiple layer partition. Such divided sub-partitions have their own respective motion vectors. In some embodiments, the error clip operation is applied at the smallest sub-partition level.

In some embodiments, respective window errors of different partitions of the block 540 are determined in the same way (e.g., by expanding the prediction buffer, or by error clipping). In some embodiments, respective window errors of different partitions of the block 540 are determined in different ways (e.g., one or more partitions by expanding the prediction buffer, and one or more partitions by error clipping).

In some embodiments, this collective prediction (e.g., using four predictors or the number of predictors corresponding to the number of partitions or sub-partitions) is used to estimate the weight of prediction for a specific reference frame. For example, in the case where four 16×16 partitions are enabled, the SSE (or SAD) of each 16×16 partition is calculated and normalized. In such cases, the block error is the same for samples in the same 16×16 partition, but different from samples in different partitions. A combined error is derived based on the window error and the block error as:

$$\text{Combined\_error} = \frac{(WindowError * n + BlockError)}{n+1} \qquad \text{Equation 2}$$

Combined Error

The block error provides a coarse estimate of the sample in a specific partition. On the contrary, the window error provides a more accurate error estimation in a local area close to the current sample. Hence, a weight factor n is applied for the window error to make the final error estimation more biased toward the window error. In some embodiments the weight factor n is 5 (e.g., or n can be any number greater than 1.5).

The combined error is further used to calculate scaled_error, defined as:

$$\text{scaled\_error} = (\text{combined\_error} * \text{distance\_factor}/\text{decay\_factor}) \qquad \text{Equation 3}$$

Scaled Error where distance_factor is a parameter calculated based on the motion vector and decay_factor is a parameter for reducing the error (e.g., thereby increasing the weight, as shown in the equation below). For example, when the motion vector is large, the distance it points to is far away from current block. A larger distance_factor in such scenarios indicates that the derived prediction is likely not good, resulting in a smaller weight. On the other hand, decay_factor is determined by a configured quantization parameter, filter strength, and the noise level of current frame. And the final weight is determined by:

$$\text{weight} = e^{-scaled\_error} \qquad \text{Equation 4}$$

Prediction Weight

In general, the larger the scaled error, the smaller the final weight of the prediction. The weight is then used to obtain final filtered sample using the equation $$P_{filtered} = \frac{\sum (w_i * P_i)}{\sum w_i},$$

described earlier. In some embodiments, the final filtered sample is signaled by the encoder (e.g., as the encoder synthesized ARF) and stored in the decoded frame buffer until the encoder explicitly signals in the bitstream that the synthesized ARF stored in the decoded frame buffer is to be replaced.

Figure 6A:
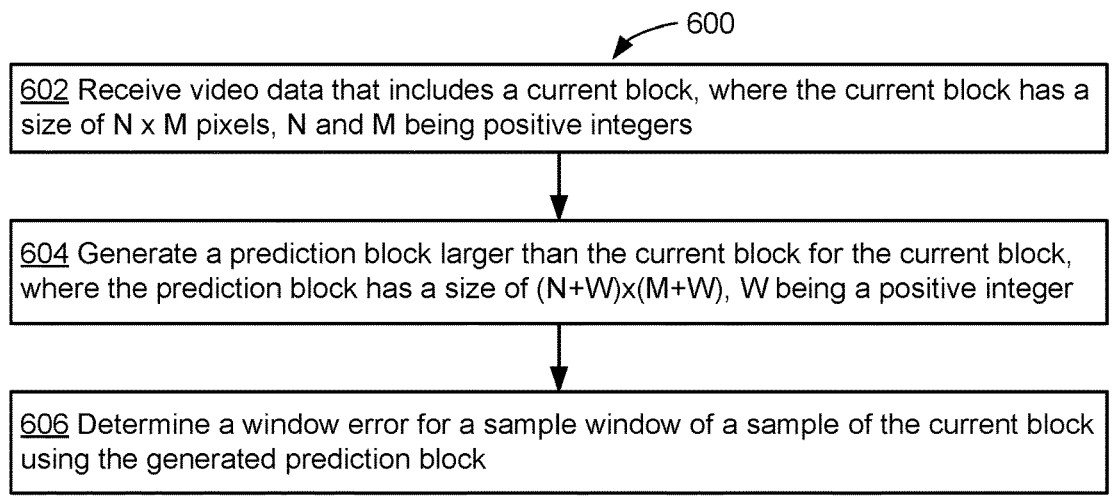
FIGS. 6A-6B are flow diagrams illustrating example methods of encoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a current block. The current block has a size of N×M pixels, N and M being positive integers (e.g., block 508 in FIG. 5B). The system generates (604) a prediction block larger than the current block for the current block (e.g., an enlarged prediction block such as prediction buffer 514 for block 508 in FIG. 5B) The prediction block has a size of (N+W)×(M+W) pixels, W being a positive integer. The system determines (606) a window error for a sample window (e.g., window 512 in FIG. 5B) of a sample of the current block (e.g., sample 510 in block 508 in FIG. 5B) using the generated prediction block. For example, window error and the block error are estimated for each sample. The window error may include a Sum Squared Error (SSE) being calculated for a sample window and normalized to the number of samples within the sample window. Provided the window size for each sample is defined as W×W (W>0), the prediction buffer is enlarged to (N+(W−1))×(M+(W−1)), or (N+V)×(M+V) where V=W−1, so that all necessary samples required for window error estimation for boundary samples are collected. The prediction block that is larger than the current block may be generated at a motion compensation stage, and is generated using motion vector information and a reference frame associated with the current block.

Figure 6B:
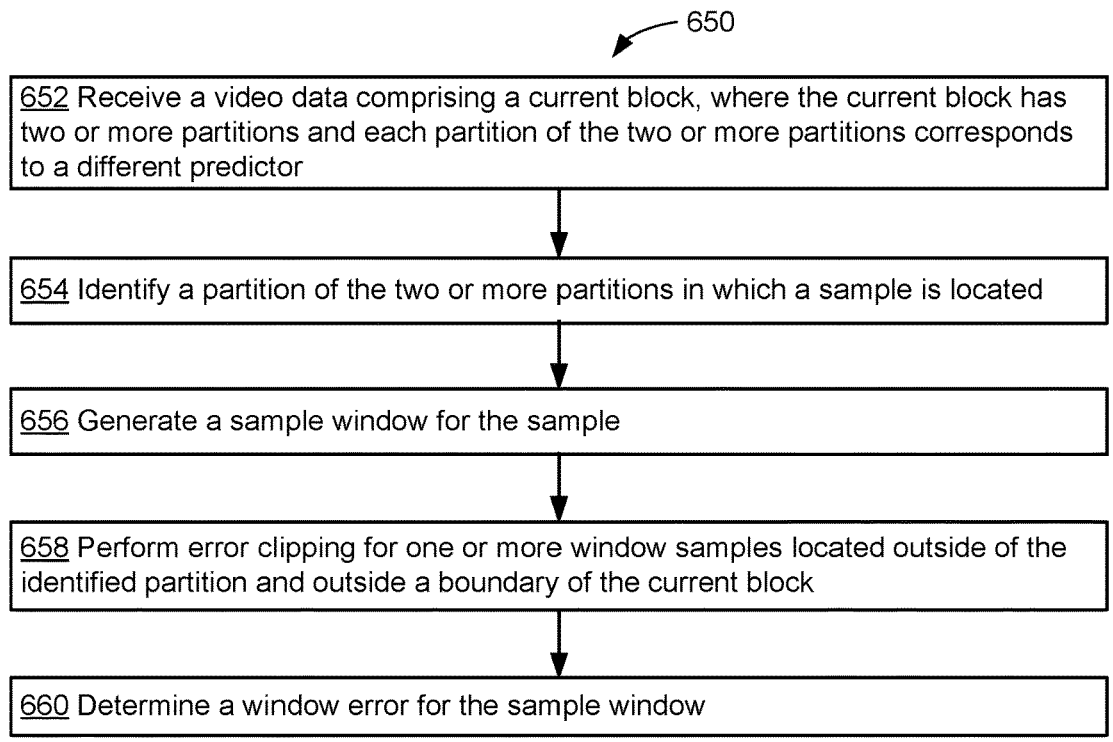

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a current block, where the current block has two or more partitions and each partition of the two or more partitions corresponds to a different predictor (e.g., predictor 0, predictor 1, predictor 2, and predictor 3 in FIGS. 5C and 5D). The system identifies (654) a partition of the two or more partitions in which a sample is located (e.g., sample 546 and sample 552 in the partition associated with predictor 0 in FIGS. 5C and 5D). The system generates (656) a sample window for the sample (e.g., window 548 in FIG. 5C and window 550 in FIG. 5D). The system performs (658) error clipping for one or more window samples located outside of the identified partition and outside a boundary of the current block (e.g., error clipping in window 548 of FIG. 5C and error clipping in window 550 of FIG. 5D). The system determines (660) a window error for the sample window.

Although FIG. 6A and FIG. 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, in accordance with determining that the current block has two or more partitions: the system identifies a partition of the two or more partitions in which the sample is located and generates the sample window for the sample (e.g., sample 546 in the partition associated with Predictor 0 in FIG. 5C). The system also performs error clipping for one or more window samples located outside of the identified partition. The window error is determined after performing the error clipping. Window samples are samples within a W×W sample window in which the (current) sample is centered, for example, if there is a partition scheme enabled within the N×M block (e.g., a 32×32 block is divided into four 16×16 sub-blocks), the error clipping is performed for samples at partition boundaries. Error clipping includes copying a sample error value for a sample at a partition for use with window samples outside of the partition. In some embodiments, instead of performing error clipping for one or more window samples located outside of the identified partition, a prediction sub-block that is larger than the current sub-block (e.g., an enlarged prediction sub-block) is generated for the identified partition using a motion vector associated with the identified partition and a reference frame associated with the identified partition.

In some embodiments, the two or more partitions include two or more partition levels, and wherein the identified partition is a smallest partition level. For example, the sub-partition may be further divided, resulting in a recursive partition, or multiple layer partition. The divided sub-partitions have their own motion vectors, and the error clip operation is applied at the smallest sub-partition level.

In some embodiments, determining the window error includes deriving a sum squared error (SSE) for the sample window. In some embodiments, determining the window error includes deriving a sum of absolute differences (SAD) for the sample window. For example, the window error may be an SAD, an SSE, or other metric calculated based on the difference between an original sample and a predicted sample. In some embodiments, the window error for the current block is determined as part of applying a temporal filter to the current block. For example, the temporal filter replaces the current block with a filtered block for a subsequent encoding process.

In some embodiments, the system derives a prediction weight for the current block using the determined window error. For example, the window error for a sample is used (e.g., in combination with a block error) to derive a weight for a sample prediction for the sample. In some embodiments, the prediction weight corresponds to a prediction using a respective reference frame for the current block; and the system generates a filtered current block using the prediction weight (e.g., filtered block 416 in FIG. 4); and the system signals the filtered current block in a video bitstream.

In some embodiments, the system receives video data that includes a current block (e.g., block 511 in FIG. 5A, and/or block 508 in FIG. 5B), where the current block has two or more partitions and each partition of the two or more partitions corresponds to a different predictor (e.g., partitions corresponding to Predictor 0, Predictor 1, Predictor 2, Predictor 3 in FIGS. 5C and 5D). The system identifies a partition of the two or more partitions in which a sample is located, and the system generates a sample window for the sample. The system performs error clipping for one or more window samples located outside of the identified partition and outside a boundary of the current block (e.g., window 548 in FIG. 5C, and/or window 550 in FIG. 5D). After performing the error clipping, the system determines a window error for the sample window.

In some embodiments, the current block has a size of N×M pixels. The window error is determined using a prediction block for the current block, the generated prediction block has a size of (N+W)×(M+W) pixels, N, M, and W being positive integers.

In some embodiments, performing the error clipping includes copying a value for a first sample at a partition boundary to a second sample located outside the partition boundary. For example, a sample error value at a left boundary is copied to a sample to the left of the left boundary, a sample error value at a right boundary is copied to a sample to the right of the right boundary, a sample error value at a top boundary is copied to a sample above the top boundary, and a sample error value at a bottom boundary is copied to a sample below the bottom boundary. For example, an error is calculated for the first sample, and the calculated error is copied for the second sample.

In some embodiments, the prediction weight corresponds to a prediction using a respective reference frame for the current block; and the system generates filtered current block using the prediction weight; and the system signals the filtered current block in a video bitstream.

In some embodiments, the system receives video data comprising a current block (e.g., block 511 in FIG. 5A, and/or block 508 in FIG. 5B), where the current block has two or more partitions and each partition of the two or more partitions corresponds to a different predictor (e.g., partitions corresponding to Predictor 0, Predictor 1, Predictor 2, Predictor 3 in FIGS. 5C and 5D). The system identifies a partition of the two or more partitions in which a sample is located, where the partition has a size of N×M pixels, N and M being positive integers. The system generates a prediction block for the partition (e.g., an enlarged prediction block, enlarged prediction buffer 544 in FIG. 5C), where the generated prediction block has a size of (N+W)×(M+W) pixels, W being a positive integer, and where the generated prediction block is generated using motion vector information of the partition. The system determines a window error for a sample window of the sample using the generated prediction block. Turning now to some example embodiments.

(A1) In one aspect, some embodiments include a method (e.g., the method 600) of video encoding. In some embodiments, the method is performed at a computing system (e.g., the server system 112, the source device 102, or the electronic device 120) having control circuitry and memory. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a current block, where the current block has a size of N×M pixels, N and M being positive integers (e.g., block 508 in FIG. 5B); (ii) generating a prediction block larger than the current block for the current block (e.g., an enlarged prediction block, enlarged prediction buffer 514 for block 508 in FIG. 5B), where the generated prediction block has a size of (N+W)×(M+W) pixels, W being a positive integer; (iii) determining a window error for a sample window (e.g., window 512 in FIG. 5B) of a sample of the current block (e.g., sample 510 in block 508 in FIG. 5B) using the generated prediction block.

(A2) In some embodiments of A1, the method further includes: in accordance with determining that the current block has two or more partitions: (i) identifying a partition of the two or more partitions in which the sample is located; (ii) generates the sample window for the sample; and (iii) performing error clipping for one or more window samples located outside of the identified partition, where the window error is determined after performing the error clipping.

(A3) In some embodiments of A2, the two or more partitions include two or more partition levels, and where the identified partition is a smallest partition level.

(A4) In some embodiments of any of A1-A3, determining the window error includes deriving a sum squared error (SSE) for the sample window.

(A5) In some embodiments of any of A1-A4, determining the window error includes deriving a sum of absolute differences (SAD) for the sample window.

(A6) In some embodiments of any of A1-A5, the window error for the current block is determined as part of applying a temporal filter to the current block.

(A7) In some embodiments of any of A1-A6, the method includes deriving a prediction weight for the current block using the determined window error.

(A8) In some embodiments of A7, the prediction weight corresponds to a prediction using a respective reference frame for the current block; and the method includes (i) generating a filtered current block using the prediction weight (e.g., filtered block 416 in FIG. 4); and (ii) signaling the filtered current block in a video bitstream.

(A9) In some embodiments of any of A1-A8, the current block has a size of 32×32 pixels.

(B1) In one aspect, some embodiments include a method (e.g., the method 650) of video encoding. In some embodiments, the method is performed at a computing system (e.g., the server system 112, the source device 102, or the electronic device 120) having control circuitry and memory. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a current block, wherein the current block has two or more partitions and each partition of the two or more partitions corresponds to a different predictor (e.g., predictor 0, predictor 1, predictor 2, and predictor 3 in FIGS. 5C and 5D); (ii) identifying a partition of the two or more partitions in which a sample is located (e.g., sample 546 and sample 552 in the partition associated with predictor 0 in FIGS. 5C and 5D); (iii) generating a sample window for the sample (e.g., window 548 in FIG. 5C and window 550 in FIG. 5D); (iv) performing error clipping for one or more window samples located outside of the identified partition and outside a boundary of the current block (e.g., error clipping in window 548 of FIG. 5C and error clipping in window 550 of FIG. 5D); and (v) after performing the error clipping, determining a window error for the sample window.

(B2) In some embodiments of B1, the current block has a size of N×M pixels, and the window error is determined using a prediction block larger than the current block for the current block, the prediction block having a size of (N+W)×(M+W) pixels, N, M, and W being positive integers.

(B3) In some embodiments of B1 or B2, performing the error clipping includes copying a value for a first sample at a partition boundary to a second sample located outside the partition boundary.

(B4) In some embodiments of any of B1-B3, performing error clipping for one or more window samples located outside of the current block.

(B5) In some embodiments of any of B1-B4, the method includes deriving a prediction weight for the current block using the determined window error.

(B6) In some embodiments of any of B1-B5, the prediction weight corresponds to a prediction using a respective reference frame for the current block; and the method includes generating a filtered current block using the prediction weight; and signaling the filtered current block in a video bitstream.

(B7) In some embodiments of any of B1-B6, the current block has a size of 32×32 pixels.

(C1) In one aspect, some embodiments include a method of video encoding. In some embodiments, the method is performed at a computing system (e.g., the server system 112, the source device 102, or the electronic device 120) having control circuitry and memory. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data including a current block, wherein the current block has two or more partitions and each partition of the two or more partitions corresponds to a different predictor; (ii) identifying a partition of the two or more partitions in which a sample is located, where the partition has a size of N×M pixels, N and M being positive integers; (iii) generating a prediction block larger than the current block for the partition (e.g., an enlarged prediction block), where generated prediction block has a size of (N+W)×(M+W) pixels, W being a positive integer, and where the prediction block is generated using motion vector information of the partition; and (iv) determining a window error for a sample window of the sample using the generated prediction block.

(C2) In some embodiments of C1, the two or more partitions include two or more partition levels, and where the identified partition is a smallest partition level.

(C3) In some embodiments of any of C1-C2, determining the window error includes deriving a sum squared error (SSE) for the sample window.

(C4) In some embodiments of any of C1-C3, determining the window error includes deriving a sum of absolute differences (SAD) for the sample window.

(C5) In some embodiments of any of C1-C4, the window error for the current block is determined as part of applying a temporal filter to the current block.

(C6) In some embodiments of any of C1-C5, the method includes deriving a prediction weight for the current block using the determined window error.

(C7) In some embodiments of C6, the prediction weight corresponds to a prediction using a respective reference frame for the current block; and the method includes (i) generating a filtered current block using the prediction weight; and (ii) signaling the filtered current block in a video bitstream.

(C8) In some embodiments of any of C1-C7, the current block has a size of 32×32 pixels.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A9, B1-B7, and C1-C8 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A9, B1-B7, and C1-C8 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video encoding performed at a computing system having memory and one or more processors, the method comprising:
- receiving video data comprising a current block, wherein the current block has a size of N×M pixels, N and M being positive integers;
- generating a prediction block larger than the current block for the current block and generating a prediction buffer for the current block that is larger than the current block, wherein the prediction block has a size of (N+W)×(M+W) pixels, W being a positive integer; and
- determining a window error for a sample window of a sample of the current block using the generated prediction block, wherein W is based on a size of the sample window.

2. The method of claim 1, further comprising:
- in accordance with determining that the current block has two or more partitions:
  - identifying a partition of the two or more partitions in which the sample is located;
  - generating the sample window for the sample; and
  - performing error clipping for one or more window samples located outside of the identified partition, wherein the window error is determined after performing the error clipping.

3. The method of claim 2, wherein the two or more partitions comprise two or more partition levels, and wherein the identified partition is a smallest partition level.

4. The method of claim 1, wherein determining the window error comprises deriving a sum squared error (SSE) for the sample window.

5. The method of claim 1, wherein determining the window error comprises deriving a sum of absolute differences (SAD) for the sample window.

6. The method of claim 1, wherein the window error for the current block is determined as part of applying a temporal filter to the current block.

7. The method of claim 1, further comprising deriving a prediction weight for the current block using the determined window error.

8. The method of claim 7, wherein the prediction weight corresponds to a prediction using a respective reference frame for the current block; and
the method further comprises:
- generating a filtered current block using the prediction weight; and
- signaling the filtered current block in a video bitstream.

9. The method of claim 1, wherein the current block has a size of 32×32 pixels.

10. A computing system, comprising:
- control circuitry;
- memory; and
- one or more sets of instructions stored in the memory and configured for execution by the control circuitry, the one or more sets of instructions comprising instructions for:
  - receiving video data comprising a current block, wherein the current block has a size of N×M pixels, N and M being non-zero positive integers;
  - generating a prediction block larger than the current block for the current block and generating a prediction buffer for the current block that is larger than the current block, wherein the prediction block has a size of (N+W)×(M+W) pixels, W being a non-zero positive integer; and
  - determining a window error for a sample window of a sample of the current block using the generated prediction block, wherein W is based on a size of the sample window.

11. The computing system of claim 10, wherein the one or more sets of instructions further comprise instructions for, in accordance with determining that the current block has two or more partitions:
- identifying a partition of the two or more partitions in which the sample is located;
- generating the sample window for the sample; and
- performing error clipping for one or more window samples located outside of the identified partition, wherein the window error is determined after performing the error clipping.

12. The computing system of claim 11, wherein the two or more partitions comprise two or more partition levels, and wherein the identified partition is a smallest partition level.

13. The computing system of claim 10, wherein determining the window error comprises deriving a sum squared error (SSE) or a sum of absolute differences (SAD) for the sample window.

14. The computing system of claim 10, wherein the one or more sets of instructions further comprise instructions for deriving a prediction weight for the current block using the determined window error.

15. The computing system of claim 10, wherein the current block has a size of 32×32 pixels.

16. A non-transitory computer-readable storage medium storing one or more sets of instructions configured for execution by a computing device having control circuitry and memory, the one or more sets of instructions comprising instructions for:
- receiving video data comprising a current block, wherein the current block has a size of N×M pixels, N and M being positive integers;
- generating a prediction block larger than the current block for the current block and generating a prediction buffer for the current block that is larger than the current block, wherein the prediction block has a size of (N+W)×(M+W) pixels, W being a positive integer; and
- determining a window error for a sample window of a sample of the current block using the generated prediction block, wherein W is based on a size of the sample window.

17. The non-transitory computer-readable storage medium of claim 16, wherein the one or more sets of instructions further comprise instructions for, in accordance with determining that the current block has two or more partitions:
- identifying a partition of the two or more partitions in which the sample is located;
- generating the sample window for the sample; and
- performing error clipping for one or more window samples located outside of the identified partition, wherein the window error is determined after performing the error clipping.

18. The non-transitory computer-readable storage medium of claim 17, wherein the two or more partitions comprise two or more partition levels, and wherein the identified partition is a smallest partition level.

19. The non-transitory computer-readable storage medium of claim 16, wherein determining the window error comprises deriving a sum squared error (SSE) or a sum of absolute differences (SAD) for the sample window.

20. The non-transitory computer-readable storage medium of claim 16, wherein the one or more sets of instructions further comprise instructions for deriving a prediction weight for the current block using the determined window error.

\* \* \* \* \*